United States Patent [19]
Coker

[11] Patent Number: 4,680,344
[45] Date of Patent: Jul. 14, 1987

[54] BLENDS OF IONOMERS AND LINEAR POLYESTERS

[75] Inventor: James N. Coker, Wilmington, Del.

[73] Assignee: E. I. Du Pont de Nemours and Company, Wilmington, Del.

[21] Appl. No.: 844,125

[22] Filed: Mar. 26, 1986

Related U.S. Application Data

[63] Continuation of Ser. No. 730,052, May 3, 1985, abandoned.

[51] Int. Cl.$^4$ ............................................. C08L 33/02
[52] U.S. Cl. ..................................... 525/176; 525/64
[58] Field of Search ................................ 525/176, 64

[56] References Cited

U.S. PATENT DOCUMENTS

| | | | |
|---|---|---|---|
| 3,435,093 | 3/1969 | Cope | 525/176 |
| 3,639,527 | 2/1972 | Brinkmann | 525/64 |
| 4,172,859 | 10/1979 | Epstein | 525/176 |
| 4,327,199 | 4/1982 | Coran | 525/176 |
| 4,337,947 | 7/1982 | Saito | 525/176 |

FOREIGN PATENT DOCUMENTS 55-021430  2/1980  Japan ................................ 525/64

Primary Examiner—John C. Bleutge
Assistant Examiner—Patricia A. Short

[57] ABSTRACT

Blends of alpha-olefin/alpha,beta-ethylenically unsaturated carboxylic acid ionomer 2–90% neutralized and linear polyester such as polyethylene terephthalate, containing over about 60% by weight of ionomer have improved heat and impact resistance.

4 Claims, No Drawings

BLENDS OF IONOMERS AND LINEAR POLYESTERS

CROSS-REFERENCE TO COPENDING APPLICATION

This is a continuation of my copending application Ser. No. 730,052 filed May 3, 1985, now abandoned.

BACKGROUND OF THE INVENTION

1. Field of the Invention

This invention relates to molding resins and more particularly it relates to blends of alpha-olefin/unsaturated carboxylic acid ionomers and linear polyesters.

2. Description of the Prior Art

Copolymers of ethylene (E) and methacrylic acid (MAA) partially neutralized with sodium or zinc ion (ethylene ionomers) are tough, abrasion resistant molding resins with excellent impact resistance and good tensile properties. An important deficiency is their lack of heat resistance, indicated by a heat deflection temperature (HDT) of 40°–45° C.

Polyethylene terephthalate (PET) is used as a molding resin for producing structures exhibiting improved heat resistance (HDT of unannealed PET=72° C.), high flexural modulus but with poor impact resistance as shown by notched Izod impact values (unannealed PET) of 0.4–0.5 ft-lb/in. at 23° C.

U.S. Pat. No. 3,435,093 discloses blends of polyethylene terephthalate (PET) and alpha-olefin/alpha,beta-unsaturated carboxylic acid copolymers wherein the carboxylic acid groups are 0–100% neutralized by metal cations. A surprising improvement in toughness is taught for these blends, along with less mold shrinkage and water uptake. Izod impact values of blends indicated in the Examples of this patent range from 0.52 to 1.12 compared to a value of 0.26 for 100% polyethylene terephthalate. The weight of the ethylene/methacrylic acid copolymer is disclosed to be about 5–150% of that of the polyethylene terephthalate, i.e., 4.75–60% ionomer and 40–95.25% PET. The preferred composition is disclosed to be 5–45% ionomer based on the weight of PET, while the optimum composition is disclosed to be one wherein the ethylene methacrylic acid copolymer is about 25% of that of polyethylene terephthalate. Preferred cations taught for the neutralization of the carboxylic acid groups are sodium, potassium, calcium, magnesium, zinc, and lead.

U.S. Pat. No. 3,639,527 discloses polyester/ionic copolymer thermoplastic molding compositions wherein the ionic copolymer is present to the extent of 0.01 to 25% of the weight of the blend. The surprising feature of that invention is stated to be that "by the addition of ionic copolymers to the polyester moulding compositions are obtained which during processing crystallize very rapidly in the mould to furnish mouldings having a very good dimensional stability, without impairing the hardness and abrasion resistance. It was also surprising that the impact strength of the polyesters modified in this manner is increased".

SUMMARY OF THE INVENTION

According to the present invention, there is provided a composition consisting essentially of (a) from above about 60 to about 85 percent by weight of ionomer selected from the group consisting of direct copolymers and graft copolymers wherein (A) said direct copolymer is derived from an alpha-olefin having the formula R—CH=CH$_2$, where R is a radical selected from the class consisting of hydrogen and alkyl radicals containing 1–8 carbon atoms, and an alpha,beta-ethylenically unsaturated carboxylic acid having 3–8 carbon atoms, the acid moieties being randomly or non-randomly distributed in the chain, (1) the alpha-olefin being present in an amount of from about 50 to about 97 weight % based on the acid copolymer, (2) the unsaturated carboxylic acid being present in an amount of from about 0.2 to about 20 weight % based on the acid copolymer, and (3) from 0 to about 30 weight % of other monoethylenically unsaturated monomer copolymerized in the acid copolymer, and (B) said graft copolymer is obtained by grafting from about 0.1 to about 5 percent by weight of an alpha,beta-unsaturated acid having 3–8 carbon atoms or an unsaturated carboxylic acid anhydride onto a preformed polyolefin backbone derived from ethylene or ethylene and a C$_3$ to C$_8$ alpha-olefin in which the polyolefin backbone may contain from 0 to about 30 weight % of other copolymerized monomer which is monoethylenically unsaturated, said direct or graft copolymer having from about 2 to about 90 weight % of the carboxylic acid groups ionized by neutralizing with metal ions selected from the group consisting of zinc, calcium, and magnesium, said ionomers having solid state properties characteristic of crosslinked polymers and melt fabricability properties characteristic of uncrosslinked thermoplastic polymers, and (b) from about 15 to less than about 40 weight percent of a linear polyester consisting of recurring units having the formula

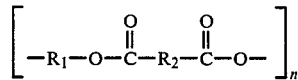

where R$_1$ is an alkylene radical having 2–8 carbon atoms and R$_2$ is an aromatic radical (e.g. phenylene, C$_6$H$_4$); said polyester having an inherent viscosity of from about 0.2 to about 1.5.

As used herein, the term "consisting essentially of" means that the named ingredients are essential; however, other ingredients which do not prevent the advantages of the present invention from being obtained can also be included.

DETAILED DESCRIPTION OF THE INVENTION

Surprisingly, it has been found that two component blends of ionomer/polyester, particularly those containing above about 60 wt. % ionomer as the continuous phase have a superior combination of properties over either of the components or over those containing the polyester component as the continuous phase such as those disclosed in U.S. Pat. Nos. 3,435,093 and 3,639,527. The blends of the present invention have surprisingly high impact resistance at low temperatures (e.g. 0° to −40° C.) as well as significantly higher impact resistance at ambient temperature than the blends of the prior art patents. In addition, the blends of the present invention exhibit enhanced heat resistance and faster molding cycles than can be obtained with ionomers alone. Moreover, the blends of the present invention do not delaminate under injection molding conditions, this behavior being due to their highly integrated structures.

Ionomers suitable for the present invention are selected from the group consisting of direct copolymers and graft copolymers wherein (A) said direct copolymer is the copolymer of an alpha-olefin having the formula $RCH=CH_2$ where R is a radical selected from the class consisting of hydrogen and alkyl radicals having 1 to 8 carbon atoms and an alpha,beta-ethylenically unsaturated carboxylic acid having 3 to 8 carbon atoms, the acid moieties being randomly or nonrandomly distributed in the polymer chain, (1) the alpha-olefin content of the copolymer being at least 50 weight percent, based on the alpha-olefin/acid copolymer, (2) the unsaturated carboxylic acid content of the copolymer being from about 0.2 to about 20 weight % and (3) from 0 to about 30 weight % of other monoethylenically unsaturated monomer copolymerized in said copolymer such as alkyl esters of ethylenically unsaturated carboxylic acids, alkyl vinyl ethers, and vinyl esters, most preferably n-butyl and isobutyl acrylate, and (B) said graft copolymer being obtained by grafting 0.1 to 5 percent by weight of an alpha,beta-unsaturated carboxylic acid having 3 to 8 carbon atoms or an unsaturated carboxylic acid anhydride onto a preformed polyolefin backbone derived from ethylene or ethylene and a $C_3$ to $C_8$ alpha-olefin in which the polyolefin backbone may contain from 0 to about 30 weight % of other monoethylenically unsaturated monomer, said direct or graft acid copolymer having from 2 to 90 weight percent of the carboxylic acid groups ionized by neutralization with metal ions selected from the group consisting of zinc, calcium and magnesium, said ionic copolymers having solid state properties characteristic of crosslinked polymers and melt fabricability properties characteristic of uncrosslinked thermoplastic polymers. The acid copolymers suitable as "ionomer" precursors are described in further detail in U.S. Pat. No. 3,520,681; U.S. Pat. No. 4,026,967; U.S. Pat. No. 4,242,924; and U.S. Pat. No. 4,248,990.

Preferred alpha-olefins are ethylene, propylene, and 1-butene. Most preferably the alpha-olefin is ethylene because of its ease of polymerization with alpha,beta-unsaturated acids.

Preferably the unsaturated acid in the ionomers of the present invention is acrylic acid, methacrylic acid, itaconic acid, maleic acid, fumaric acid, half esters of maleic acid or fumaric acid. Most preferably the unsaturated acid is acrylic acid (AA) or methacrylic acid (MAA). The ionic copolymers are described in further detail in U.S. Pat. No. 3,264,272. Acid copolymers can also be derived by reacting alpha-olefin polymers with unsaturated acids. Hence polyolefins or olefin copolymers can be reacted with alpha,beta-unsaturated acids either thermally or by using a peroxide catalyst to give acid functionalized graft copolymers. The ionomers of these polymers can be used in place of or in conjunction with the ionomers of the directly copolymerized acid copolymers.

The polyester component of the blends of the present invention can be a polymer consisting of recurring units having the formula

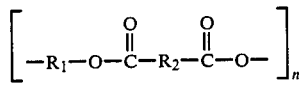

where $R_1$ is an alkylene radical consisting of 2 to 8 carbon atoms and $R_2$ is an aromatic radical (e.g. phenylene, $C_6H_4$). Examples of suitable polyesters are polyethylene terephthalate, polyethylene isophthalate, polybutylene terephthalate, polybutylene isophthalate and polyhexylene terephthalate or combinations thereof. Polyethylene terephthalate (PET) is the preferred component in that it gives the best combination of impact resistance and higher temperature performance.

The ionomer generally is present in the blends of the present invention in an amount of from above about 60 to about 85 weight percent. Preferably the concentration of ionomer should be from about 65 to about 80 weight percent and most preferably from about 68 to about 75 weight percent. Maximum low temperature impact resistance as measured by notched Izod testing is realized when the acid copolymer constitutes about 68–75 weight percent of the blend. As evidenced by photomicrographic data the ionomer component is present as the continuous phase when its concentration is higher than 60 weight percent. When the polyester is the continuous phase there is a rapid loss in low temperature impact resistance as the blend becomes richer in the polyester component. For example, blends containing 68–75 weight percent of ionomer exhibited notched Izod values of 646–1120 J/m at 20° C. in contrast to blends containing 45–50 weight percent of ionomer which gave notched Izod values of 27 to 368 J/m at $-20°$ C.

The ionic copolymer operable in the blends of this invention should be neutralized from about 2 to about 90 weight %. The preferred level of neutralization is from about 5 to about 80 weight percent with the most preferred range being from about 15 to about 75 weight percent. The alpha-olefin content of the ionic copolymer should fall in the range of from about 50 to about 97 weight percent with the preferred range being from about 70 to about 95 weight percent and the most preferred range being from about 88 to about 92 weight percent. The unsaturated carboxylic acid content of the copolymer should fall in the range of from about 0.2 to about 20 weight percent, the preferred range being from about 5 to about 15 weight percent and the most preferred range being from about 8 to about 12 weight percent, based on the ionic copolymer.

Maximum low temperature impact resistance in the blends of the present invention is obtained using acid copolymer neutralized with zinc. In contrast, very poor impact performance results were obtained with blends containing ionomer partially neutralized with sodium. Blends containing ionomer neutralized with calcium and magnesium result in good low temperature impact resistance, while lead neutralization results in poor impact performance. Ionomers containing from about 5 to about 15 weight percent (2–6 mole percent) acid comonomer neutralized to the extent of from about 5 to about 80 weight percent with zinc are preferred for use in the blends of this invention, giving the best combination of low temperature impact resistance and high temperature resistance.

Most preferably the polyester component in the blend of this invention is polyethylene terephthalate (PET). This material provides the best combination of high heat deflection temperature and impact resistance as measured by notched Izod impact performance. The polyester component operable in he blends of the present invention can exhibit a relatively broad molecular weight range (i.e. inherent viscosities of from about 0.2 to about 1.5). However, medium to medium high molecular weight polyester (inherent viscosities of from about 0.35 to about 0.8) are preferred; especially preferred is polyester exhibiting inherent viscosities in the range of from about 0.5 to about 0.7. Moreover, because under melt processing conditions the polyester component will undergo molecular weight degradation in the presence of contaminants such as water, it is important that the polyester component be incorporated in anhydrous form into the blends of the present invention. It is also important that these blends be protected from adventitious moisture prior to melt processing.

The blend of this invention unexpectedly provides a significant improvement over ionomers in heat resistance [i.e. 15°-20° C. increase in heat deflection temperature (HDT)], full retention of ionomer impact resistance (as measured by notched Izod impact) and a faster (40 percent improvement) injection molding cycle than is obtainable with ionomer alone.

The combination of heat deflection temperature, Izod impact strength at both ambient and low temperature, flexural modulus, abrasion resistance, tensile properties as well as acceptable injection molding characteristics indicates that the blends of the present invention could be competitive with a variety of molding resins (e.g. acrylonitrile/butadiene/styrene (ABS), impact-modified polypropylene) in applications for injection molded parts, automobile grills, tool housings and in any other parts normally produced from ABS. In addition, the blends can be used to prepare extruded sheets for thermoforming applications.

In the above applications, it is customary to add varying amounts of pigments, fillers and/or blowing agents. These materials along with mold release agents and lubricants can be added to the blend of this invention in amounts that are normally used without adversely affecting the physical properties of the blend.

In describing the blends of the present invention tensile strength was determined by ASTM T638, flexural modulus by ASTM 790, notched Izod impact by ASTM D256 (the notched izod values reported for some of the samples are average values from two or more measurements) and heat deflection temperature by ASTM D648.

The following examples serve to illustrate the present invention. All parts, percentages and proportions are by weight unless otherwise indicated.

All blends of neutralized acid copolymer and polyester were prepared on a 53 mm Werner and Pfleiderer twin-screw extruder using the following conditions:

| RPM | Zone 1 | Zone 2 | Zone 3 | Zone 4 | Zone 5 | Rate (lb/hr) | VAc mm | Melt Pressure (psig) |
|---|---|---|---|---|---|---|---|---|
| 150 | 160 | 225 | 245 | 260 | 265 | 15 | 29.5 | 50 |

The resulting pelletized materials were injection molded using the following conditions:

| Rear | Center | Front | Nozzle | Melt | Mold | Injection Pressure (psig) | Ram Speed | Screw Speed (rpm) |
|---|---|---|---|---|---|---|---|---|
| 280° C. | 280° C. | 280° C. | 280° C. | 290° C. | Cold | 500 | Fast | 60 |

EXAMPLE 1

A series of blends containing various ratios of "Ionomer A" [89/11 weight % ethylene/methacrylic acid copolymer, 59% neutralized with zinc ion to a final melt index (MI) of 5] and polyethylene terephthalate (inherent viscosity of 0.6) were prepared in pelletized form on twin-screw equipment. The resulting blends were injection molded into test bars and plaques and characterized. The composition and physical properties of the blends are summarized in Table I.

TABLE I

| | Example 1, Blend | | | | | | | | | | |
|---|---|---|---|---|---|---|---|---|---|---|---|
| | a | b | c | d | e | f | g | h | i | j | k |
| Composition (wt % Ionomer A/PET) | 100/0 | 90/10 | 80/20 | 70/30 | 65/35 | 60/40 | 50/50 | 40/60 | 35/65 | 30/70 | 0/100 |
| Notched Izod (J/m) | | | | | | | | | | | |
| 23° C. | 673 | 518 | 710 | 838 | 934 | 1010 | 1130 | 1130 | 870 | 59 | 53* |
| −20° C. | 715 | 448 | 603 | 646 | 710 | 1150 | 368 | 101 | 64 | 59 | 37* |
| −40° C. | 705 | 534 | 838 | 961 | 1050 | 1190 | 352 | 43 | 75 | 43 | 27* |
| HDT (°C.) @ 66 psig (455 kPa) | 42* | 48.5 | 44.5 | 45 | 47 | 51 | 65 | 65.5 | 69.5 | 69 | 72* |

*value by extrapolation

EXAMPLE 2

A second series of blends containing various ratios of "Ionomer B" [88/12 weight % ethylene/methacrylic acid copolymer, 38% neutralized with zinc ion to a final melt index of 2.8] and polyethylene terephthalate (inherent viscosity of 0.6) was prepared and characterized as described in Example 1. The composition and physical properties of the blends are summarized in Table II.

TABLE II

| | Example 2, Blend | | | | | | |
|---|---|---|---|---|---|---|---|
| | a | b | c | d | e | f | g |
| Composition (wt % Ionomer B/PET) | 100/0 | 90/10 | 80/20 | 70/30 | 50/50 | 35/65 | 0/100 |
| Notched Izod (J/m) | | | | | | | |
| 23° C. | 817 | 694 | 790 | 838 | 43 | 53* | 53* |
| −20° C. | 1040 | 891 | 891 | 972 | 27 | 69 | 32* |

TABLE II-continued

| | Example 2, Blend | | | | | | |
|---|---|---|---|---|---|---|---|
| | a | b | c | d | e | f | g |
| −40° C. | 972 | 972 | 843 | 1230 | 27* | 85 | 27* |
| HDT (°C.) @ 66 psig (455 kPa) | 42* | 43* | 44.5 | 46 | 64.5 | 71.5 | 72* |

*extrapolated or interpolated value

EXAMPLE 3

A series of blends containing various ratios of "Ionomer C" (85/15 weight % ethylene/methacrylic acid copolymer, 58% neutralized with Zn ion to MI=2.8) and PET (inherent viscosity 0.6) was prepared and characterized as described above. The composition and physical properties of the blends are summarized in Table III.

TABLE III

| | Example 3, Blend | | | | | | | | | | | |
|---|---|---|---|---|---|---|---|---|---|---|---|---|
| | a | b | c | d | e | f | g | h | i | j | k | l |
| Composition (wt % Ionomer C/PET) | 100/0 | 90/10 | 80/20 | 70/30 | 60/40 | 50/50 | 40/60 | 35/65 | 30/70 | 20/80 | 10/90 | 0/100 |
| Notched Izod (J/m) | | | | | | | | | | | | |
| 23° C. | 352 | 342 | 502 | 1090 | 1070 | 1310 | 240 | 347 | 69 | 53 | 37 | 53* |
| −20° C. | 326 | 315 | 432 | 1120 | 1160 | 368 | 75 | 80 | 53 | 43 | 37 | 37* |
| −40° C. | 326 | 464 | 406 | 977 | 1150 | 144 | 64 | 69 | 59 | 43 | 27 | 27* |
| HDT (°C.) @ 66 psig (455 kPa) | 42* | 40 | 43.5 | 48.5 | 56* | 63.5 | 65 | 71 | 67 | 70.5 | 73.5 | 72* |

*interpolated/extrapolated data

EXAMPLE 4

A series of blends containing various ratios of "Ionomer D" (90/10 weight % ethylene/methacrylic acid copolymer, 71% neutralized with Zn ion to MI=1.1) and PET (inherent viscosity 0.6) was prepared and characterized as described above. The composition and physical properties of the blends are summarized in Table IV.

TABLE IV

| | Example 4, Blend | | | | | | | | |
|---|---|---|---|---|---|---|---|---|---|
| | a | b | c | d | e | f | g | h | i |
| Composition (wt % Ionomer D/PET) | 90/10 | 80/20 | 70/30 | 50/50 | 40/60 | 35/65 | 30/60 | 20/80 | 10/90 |
| Notched Izod (J/m) | | | | | | | | | |
| 23° C. | 352 | 496 | 843 | 710 | 192 | 85 | 64 | 48 | 27 |
| −20° C. | 374 | 566 | 897 | 139 | 159 | 43 | 37 | 21 | 27 |
| −40° C | 379 | 347 | 1164 | 107 | 101 | 37 | 37 | 27 | 27 |

*interpolated/extrapolated data

EXAMPLES 5 TO 7

Blends of various sodium neutralized ionomers and polyethylene terephthalate [PET] (inherent viscosity of 0.6) have been prepared and characterized as described above and compared with corresponding blends containing zinc neutralized ionomer. The composition and physical properties of the blends are summarized in Tables V, VI and VII, respectively.

TABLE V

| | Example 5, Blend | | | |
|---|---|---|---|---|
| | a | b | c | d |
| Ionomer Type | 89/11 wt. % E/MAA 35% neutralized with Na+ to final MI = 10 | | 88/12 wt. % E/MAA 38% neutralized with Zn++ to final MI = 2.8 | |
| Composition (wt % Ionomer/PET) | 70/30 | 50/50 | 70/30 | 50/50 |
| Notched Izod (J/m) | | | | |
| 23° C. | 251 | 27 | 838 | 43 |
| −20° C. | 43 | 32 | 972 | 27 |
| −40° C. | 43 | 32 | 1230 | 27* |
| HDT (°C.) @ 66 psig (455 kPa) | 46.5 | 63 | 46 | 64.5 |

*extrapolated/interpolated data

TABLE VI

| | Example 6, Blend | | | |
|---|---|---|---|---|
| | a | b | c | d |
| Ionomer Type | 85/15 wt. % E/MAA 59% neutralized with Na+ to final MI = 0.9 | | 85/15 wt. % E/MAA 58% neutralized with Zn++ to final MI = 0.7 | |
| Composition (wt % Ionomer/PET) | 70/30 | 50/50 | 70/30 | 50/50 |
| Notched Izod (J/m) | | | | |
| 23° C. | 208 | 16 | 1090 | 1310 |
| −20° C. | 53 | 11 | 1120 | 368 |
| −40° C. | 32 | 11* | 977 | 144 |
| HDT (°C.) @ 66 psig | 45.5 | 77 | 48.5 | 63.5 |

TABLE VI-continued

| | Example 6, Blend | | |
|---|---|---|---|
| Ionomer Type | a<br>85/15 wt. % E/MAA<br>59% neutralized with<br>Na+ to final MI = 0.9 | b | c d<br>85/15 wt. %<br>E/MAA 58% neu-<br>tralized with<br>Zn++ to final<br>MI = 0.7 |

(455 kPa)

*extrapolated/interpolated data

TABLE VII

| | Example 7, Blend | | | |
|---|---|---|---|---|
| Ionomer Type | a b<br>90/10 wt. % E/MAA<br>50% neutralized with<br>Na+ to final MI = 12 | | c d<br>89/11 wt. %<br>E/MAA 57% neu-<br>tralized with<br>Zn++ to final<br>MI = 5 | |
| Composition (wt % Ionomer/PET) | 70/30 | 50/50 | 70/30 | 50/50 |
| Notched Izod (J/m) | | | | |
| 23° C. | 187 | 37 | 838 | 1130 |
| −20° C. | 139 | 21 | 646 | 368 |
| −40° C. | 101 | 16* | 961 | 352 |
| HDT (°C.) @ 66 psig | 45.5 | 66.5 | 45 | 65 |

(455 kPa)

*extrapolated/interpolated value

The comparisons of Examples 5 to 7 demonstrate the superiority in impact resistance of blends prepared with zinc-neutralized ionomer over those produced with sodium neutralized ionomer.

I claim:

1. A composition consisting essentially of
   (a) about 60–85% of an ionomer consisting of a direct copolymer of 80–95% of ethylene and 5–20% of an $\alpha,\beta$-unsaturated carboxylic acid selected from the group consisting of acrylic acid and methacrylic acid, no third comonomer being present, and the carboxylic acid groups being neutralized to the extent of 5–80% with zinc ions, said ionomer having a notched Izod impact resistance at −20° C. of at most 1040 J/m; and
   (b) about 15–40% of polyethylene terephthalate having an inherent viscosity of about 0.2 to 1.5;
   all the percentages being by weight.

2. A composition of claim 1, wherein the ethylene content of the ionomer is about 89%.

3. A composition of claim 1, wherein the ethylene content of the ionomer is about 88%.

4. A composition of claim 1, wherein the ethylene content of the ionomer is about 85%.

* * * * *